United States Patent
Wakayama et al.

(10) Patent No.: US 9,612,449 B2
(45) Date of Patent: Apr. 4, 2017

(54) AXIALLY SYMMETRIC POLARIZATION CONVERSION ELEMENT

(71) Applicants: SAITAMA MEDICAL UNIVERSITY, Saitama (JP); UTSUNOMIYA UNIVERSITY, Utsunomiya-shi, Tochigi (JP)

(72) Inventors: Toshitaka Wakayama, Saitama (JP); Toru Yoshizawa, Yokohama (JP); Yukitoshi Otani, Musashino (JP)

(73) Assignees: Saitama Medical University (JP); Utsunomiya University (JP)

( * ) Notice: Subject to any disclaimer, the term of this patent is extended or adjusted under 35 U.S.C. 154(b) by 0 days.

(21) Appl. No.: 14/377,288

(22) PCT Filed: Feb. 7, 2013

(86) PCT No.: PCT/JP2013/052834
§ 371 (c)(1),
(2) Date: Aug. 7, 2014

(87) PCT Pub. No.: WO2013/118810
PCT Pub. Date: Aug. 15, 2013

(65) Prior Publication Data
US 2015/0002934 A1 Jan. 1, 2015

(30) Foreign Application Priority Data

Feb. 8, 2012 (JP) .................. 2012-025150

(51) Int. Cl.
*G02B 5/30* (2006.01)
*G02B 27/28* (2006.01)
(Continued)

(52) U.S. Cl.
CPC ........... *G02B 27/286* (2013.01); *G02B 5/001* (2013.01); *G02B 5/3025* (2013.01);
(Continued)

(58) Field of Classification Search
CPC ... G02B 5/3025; G02B 27/286; G02B 27/0927; G02B 5/001; G02B 27/0977
(Continued)

(56) References Cited

U.S. PATENT DOCUMENTS 2,430,833 A * 11/1947 Stearns, Jr. ............... G01J 3/42
250/204
4,222,011 A * 9/1980 Kurnit ..................... H01S 3/305
330/4.5
(Continued)

FOREIGN PATENT DOCUMENTS

JP    H09-184918 A    7/1997
JP    2002-182030 A    6/2002
(Continued)

OTHER PUBLICATIONS

Fink, "Polarization Effects of Axicons", Applied Optics, vol. 18, No. 5, pp. 581-582 (Mar. 1979).
(Continued)

*Primary Examiner* — Ricky D Shafer
(74) *Attorney, Agent, or Firm* — Harness, Dickey & Pierce, P.L.C.

(57) ABSTRACT

An axially symmetric polarization conversion element that converts incident light into an axially symmetric polarized beam includes a reflection section having a shape obtained by rotating the cross section of a Fresnel rhomb wave plate along the direction of an optical axis around an axis that is parallel to the optical axis. The axially symmetric polarization conversion element converts the incident light into an axially symmetric polarized beam by utilizing two Fresnel reflections by the reflection section.

11 Claims, 10 Drawing Sheets

(51) Int. Cl.
*G02B 27/09* (2006.01)
*G02B 5/00* (2006.01)

(52) U.S. Cl.
CPC ..... *G02B 27/0977* (2013.01); *G02B 27/0983* (2013.01); *G02B 27/0927* (2013.01)

(58) Field of Classification Search
USPC .............................. 359/485.01, 489.07, 900
See application file for complete search history.

(56) References Cited

U.S. PATENT DOCUMENTS

| | | | |
|---|---|---|---|
| 5,382,999 A * | 1/1995 | Kamon | G02B 5/001 355/53 |
| 5,436,761 A * | 7/1995 | Kamon | G02B 5/3025 355/71 |
| 6,191,880 B1 | 2/2001 | Schuster | |
| 6,392,800 B2 * | 5/2002 | Schuster | 355/71 |
| 7,167,295 B2 * | 1/2007 | Williams | G02B 27/283 359/280 |
| 2001/0012154 A1 | 8/2001 | Schuster | |
| 2002/0126380 A1 | 9/2002 | Schuster | |
| 2004/0174594 A1 | 9/2004 | Shikano | |
| 2007/0183036 A1 * | 8/2007 | Lipson | G02B 27/286 359/485.02 |
| 2007/0253059 A1 * | 11/2007 | Johs | G02B 27/286 359/485.02 |
| 2008/0226844 A1 | 9/2008 | Shemo et al. | |
| 2009/0168394 A1 | 7/2009 | Hikmet | |

FOREIGN PATENT DOCUMENTS

| | | |
|---|---|---|
| JP | 2004-233936 A | 8/2004 |
| JP | 2008-233903 A | 10/2008 |
| JP | 2009-532733 A | 9/2009 |
| WO | WO-2008-054558 A2 | 5/2008 |
| WO | WO-2011-106325 A1 | 9/2011 |

OTHER PUBLICATIONS

Odajima et al., "On the Transformation of the Distribution of Polarization in a Light Beam: II. Synthesis of Field with a Circular Symmetry", Record of Electrical and Communication Engineering Conversazione Tohoku University Japan, vol. 41, No. 1, pp. 9-12 (Mar. 1972).

Extended European Search Report for Patent Application No. EP 13746169.5, dated Sep. 2, 2015 (6 pages).

* cited by examiner

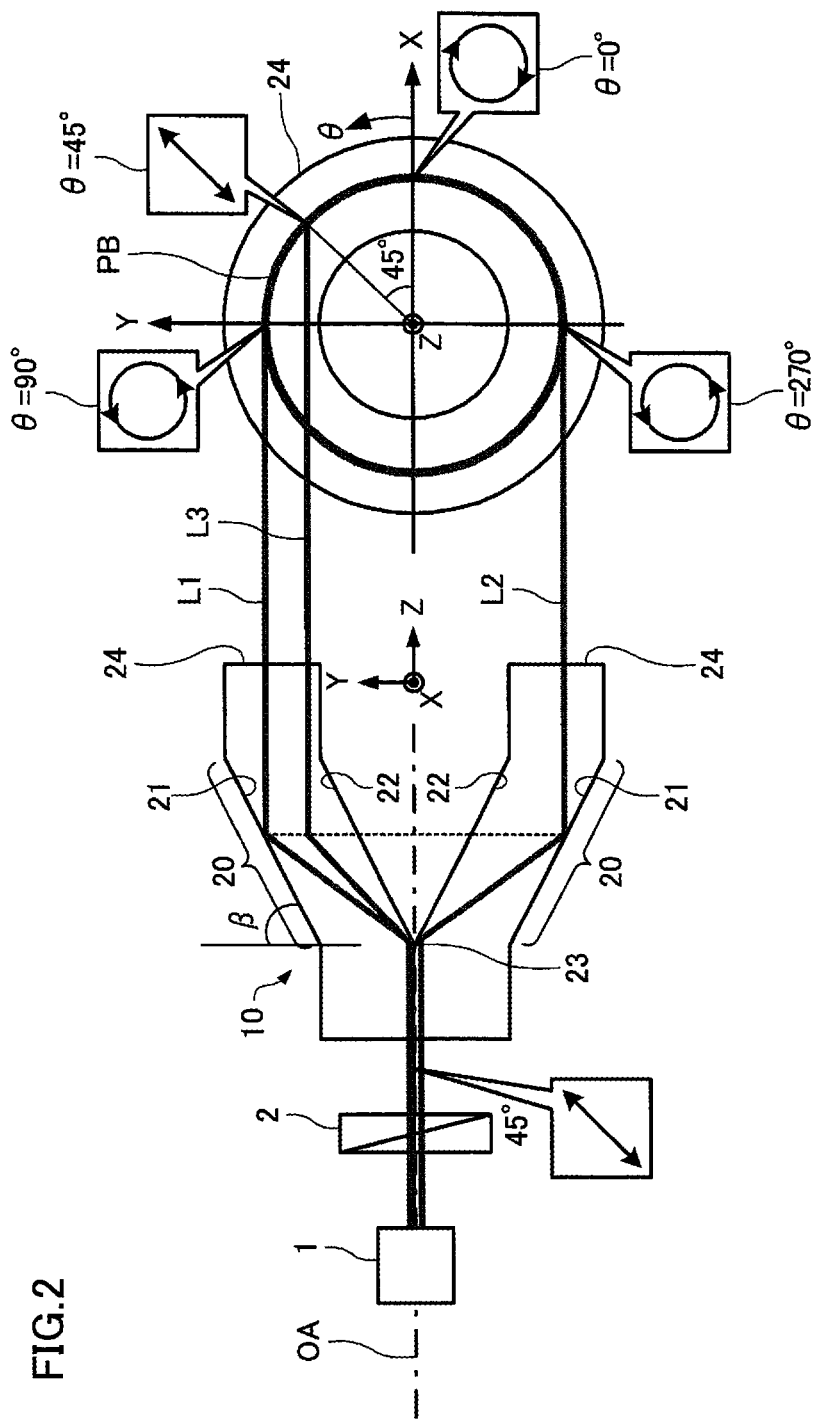

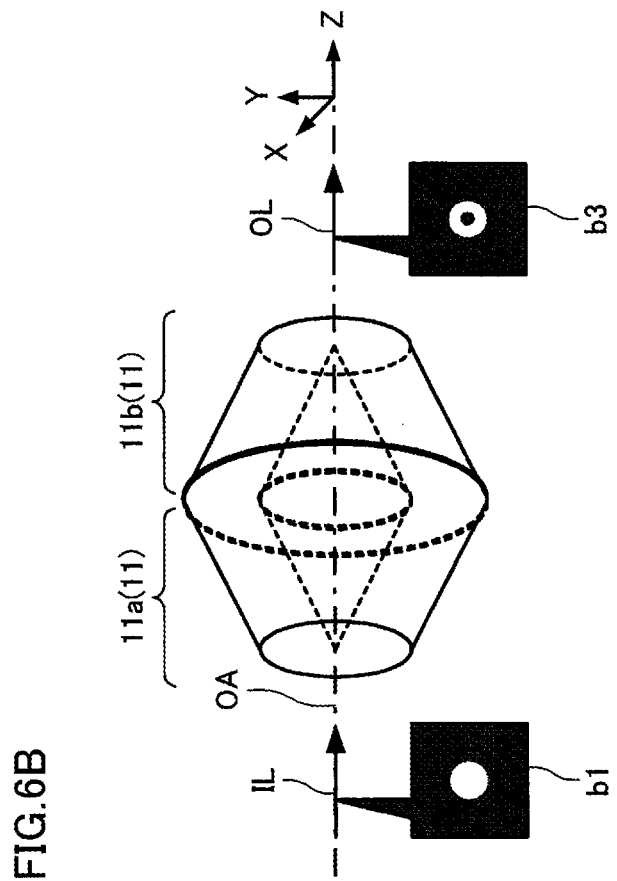

AXIALLY SYMMETRIC POLARIZATION CONVERSION ELEMENT

CROSS-REFERENCE TO RELATED APPLICATIONS

This application is a U.S. National Stage Application of International Application No. PCT/JP2013/052834 filed on Feb. 7, 2013, and published in Japanese as WO 2013/118810 A1 on Aug. 15, 2013. This application claims priority to Japanese Application No. 2012-025150 filed on Feb. 8, 2012. The entire disclosures of the above applications are incorporated herein by reference.

TECHNICAL FIELD

The present invention relates to an axially symmetric polarization conversion element, an axially symmetric polarized beam generation device, and an axially symmetric polarized beam generation method that convert incident light into an axially symmetric polarized beam.

BACKGROUND ART

A method that generates an axially symmetric polarized beam having a polarization distribution that is symmetrical with respect to the optical axis has been known, and an example in which a super-resolution microscope or super-resolution laser processing is implemented by using the same has been reported. A method that generates an axially symmetric polarized beam by using a photo-induced liquid crystal polymer material or a liquid crystal spatial phase modulator has been proposed (see JP-A-2008-233903, for example).

SUMMARY OF THE INVENTION

Technical Problem

However, a known method has a problem in that the stability of the optical element may be insufficient. Specifically, a change with the passage of time may pose a problem when using a liquid crystal polymer, and a fluctuation in the polarization plane may pose a problem when using a liquid crystal spatial phase modulator due to vibrations of the liquid crystal molecules. Moreover, a liquid crystal has temperature characteristics and wavelength dependence.

The invention was conceived in view of the above technical problems. An object of the invention is to provide an axially symmetric polarization conversion element, an axially symmetric polarized beam generation device, and an axially symmetric polarized beam generation method that can generate an axially symmetric polarized beam in a stable manner using a simple configuration.

Solution to Problem (1) According to one aspect of the invention, an axially symmetric polarization conversion element converts incident light into an axially symmetric polarized beam, and has a shape obtained by rotating a cross section of a Fresnel rhomb wave plate along a direction of an optical axis around an axis that is parallel to the optical axis.

According to another aspect of the invention, an axially symmetric polarized beam generation device generates an axially symmetric polarized beam, and includes:
a light source; and
an axially symmetric polarization conversion element that converts incident light from the light source into the axially symmetric polarized beam,
the axially symmetric polarization conversion element having a shape obtained by rotating a cross section of a Fresnel rhomb wave plate along a direction of an optical axis around an axis that is parallel to the optical axis.

These aspects of the invention thus provide an axially symmetric polarization conversion element and an axially symmetric polarized beam generation device that can generate an axially symmetric polarized beam in a stable manner using a simple configuration.

(2) In the axially symmetric polarization conversion element and the axially symmetric polarized beam generation device, the axially symmetric polarization conversion element may convert the incident light into the axially symmetric polarized beam by utilizing N (N is a positive integer) number of Fresnel reflections.

(3) In the axially symmetric polarization conversion element and the axially symmetric polarized beam generation device, the axially symmetric polarization conversion element may convert an incident linearly polarized Gaussian beam into a ring-shaped axially symmetric polarized beam by utilizing N (N is a positive integer) number of Fresnel reflections.

(4) In the axially symmetric polarization conversion element and the axially symmetric polarized beam generation device, the axially symmetric polarization conversion element may have an outer circumferential surface that corresponds to a slope of a truncated conical shape, and an inner circumferential surface that corresponds to a slope of an inverted conical shape that is present inside the truncated conical shape, and reflect a linearly polarized Gaussian beam incident on a vertex of the inverted conical shape by the inner circumferential surface and the outer circumferential surface to emit the ring-like axially symmetric polarized beam.

(5) In the axially symmetric polarization conversion element and the axially symmetric polarized beam generation device, the axially symmetric polarization conversion element may be formed of optical glass, optical acrylic resin and so on.

(6) In the axially symmetric polarized beam generation device, a plurality of the axially symmetric polarization conversion elements may be disposed along an optical path.

(7) According to another aspect of the invention, an axially symmetric polarized beam generation method includes generating an axially symmetric polarized beam by using an axially symmetric polarization conversion element,
the axially symmetric polarization conversion element having a shape obtained by rotating a cross section of a Fresnel rhomb wave plate along a direction of an optical axis around an axis that is parallel to the optical axis, and converting incident light into the axially symmetric polarized beam by utilizing N (N is a positive integer) number of Fresnel reflections.

This aspect of the invention thus provides an axially symmetric polarized beam generation method that can generate an axially symmetric polarized beam in a stable manner using a simple configuration.

(8) The axially symmetric polarized beam generation method may include causing linearly polarized light to be incident on the axially symmetric polarization conversion element to generate the axially symmetric polarized beam.

(9) The axially symmetric polarized beam generation method may include causing a linearly polarized Gaussian beam to be incident on the axially symmetric polarization conversion element to generate a ring-shaped axially symmetric polarized beam.

(10) The axially symmetric polarized beam generation method may include generating the axially symmetric polarized beam by using a plurality of the axially symmetric polarization conversion elements disposed along an optical path.

It is thus possible to provide an axially symmetric polarized beam generation method that can generate an axially symmetric polarized beam having various types of polarization distribution in a stable manner using a simple configuration.

BRIEF DESCRIPTION OF DRAWINGS

FIG. 2 is a diagram schematically illustrating the state of reflection of incident light by an axially symmetric polarization conversion element, and the polarization state of an axially symmetric polarized beam emitted from the axially symmetric polarization conversion element.

FIG. 6B is a diagram illustrating a configuration example when two axially symmetric polarization conversion elements are disposed along an optical path.

DESCRIPTION OF EMBODIMENTS

Exemplary embodiments of the invention are described below. Note that the following exemplary embodiments do not unduly limit the scope of the invention as stated in the claims. Note also that all of the elements described in connection with the following exemplary embodiments should not necessarily be taken as essential elements of the invention.

Figure 1A:
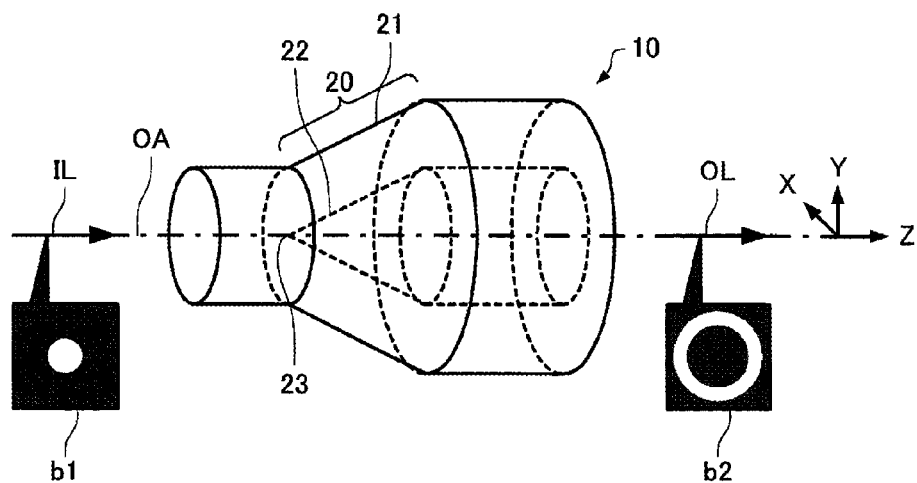
FIG. 1A is a perspective view illustrating the configuration of an axially symmetric polarization conversion element according to one embodiment of the invention.

FIG. 1A is a perspective view illustrating the configuration of an axially symmetric polarization conversion element according to one embodiment of the invention.

An axially symmetric polarization conversion element 10 is an optical element that converts incident light into an axially symmetric polarized beam by utilizing two Fresnel reflections (total reflections). The axially symmetric polarization conversion element 10 may be formed of optical glass, optical acrylic resin, or the like.

Figure 1B:
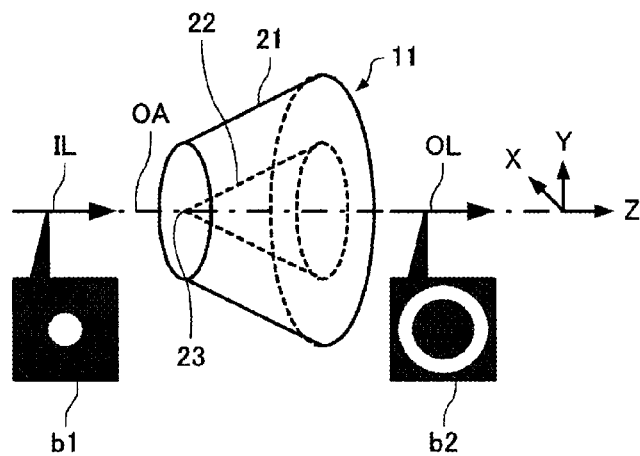
FIG. 1B is a perspective view illustrating the configuration of an axially symmetric polarization conversion element according to one embodiment of the invention.

When a Gaussian beam (see b1 in FIG. 1A) (e.g., linearly polarized beam) is incident on the axially symmetric polarization conversion element 10 as incident light IL, a ring-shaped axially symmetric polarized beam (see b2 in FIG. 1A) is emitted from the axially symmetric polarization conversion element 10 as output light OL. The incident light IL that is incident on the axially symmetric polarization conversion element 10 is totally reflected twice inside a reflection section 20 included in the axially symmetric polarization conversion element 10. As illustrated in FIG. 1B, an axially symmetric polarization conversion element 11 that includes only the reflection section 20 illustrated in FIG. 1A may be used as the axially symmetric polarization conversion element.

Figure 1C:
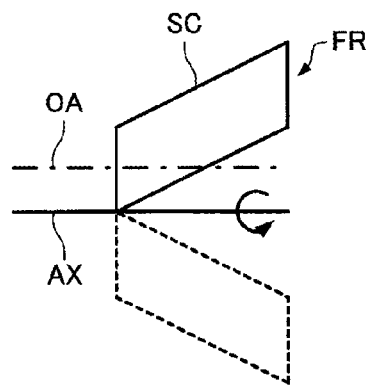
FIG. 1C is a diagram illustrating the shape of an axially symmetric polarization conversion element according to one embodiment of the invention.

As illustrated in FIGS. 1B and 1C, the reflection section 20 (axially symmetric polarization conversion element 11) has a shape obtained by rotating a cross section SC of a Fresnel rhomb wave plate FR (rhombic prism) along the direction of an optical axis OA around an axis AX that is parallel to the optical axis OA. Specifically, the reflection section 20 has a shape obtained by rotating a parallelogram around a straight line that passes through one of the vertices of the parallelogram. The reflection section 20 has an outer circumferential surface 21 that corresponds to the slope of the truncated conical shape, and an inner circumferential surface 22 that corresponds to the slope of the inverted conical shape present inside the truncated conical shape. Light incident on a vertex 23 of the inverted conical shape is reflected by the outer circumferential surface 21 and the inner circumferential surface 22. Note that the slope angle of the outer circumferential surface 21 and the slope angle of the inner circumferential surface 22 are identical.

FIG. 2 is a diagram schematically illustrating the state of reflection of the incident light by the axially symmetric polarization conversion element 10, and the polarization state of the axially symmetric polarized beam emitted from the axially symmetric polarization conversion element 10. Note that the following description is similarly applied to the case where the axially symmetric polarization conversion element 10 is replaced with the axially symmetric polarization conversion element 11 illustrated in FIG. 1B.

As illustrated in FIG. 2, light emitted from the light source 1 (e.g., laser light source or SLD) is converted by a polarizer 2 into linearly polarized light having a polarization orientation of 45°, and incident on the axially symmetric polarization conversion element 10. The light incident on the vertex 23 of the inverted conical shape of the reflection section 20 is radially reflected by the inner circumferential surface 22. The light radially reflected by the inner circumferential surface 22 is reflected by the outer circumferential surface 21, and emitted from an exit face 24 as a ring-shaped axially symmetric polarized beam PB.

When the incident light is reflected (total reflection or Fresnel reflection) by the inner circumferential surface 22, a retardation delta occurs between the orthogonal polarized components (P-polarized component and S-polarized component). When the light reflected by the inner circumferential surface 22 is reflected by the outer circumferential surface 21, the retardation delta occurs between the orthogonal polarized components. Specifically, a retardation 2delta occurs due to the two total reflections by the reflection section 20. A retardation DELTA (DELTA=2delta) obtained by such Fresnel reflection is given by the following expression.

$$\Delta = 4\tan^{-1}\frac{\sqrt{n^2\sin^2\beta - 1}}{n\sin\beta\tan\beta} \quad (1)$$

where, n is the refractive index of the material (e.g., glass or acrylic material) that forms the axially symmetric polarization conversion element 10, and beta is the slope angle (i.e., the slope angle with respect to the vertical plane) of the outer circumferential surface 21 of the reflection section 20. In the example illustrated in FIG. 2, the refractive index n and the slope angle beta of the axially symmetric polarization conversion element 10 are selected so that the retardation DELTA=90° (quarter wavelength).

Figure 3:
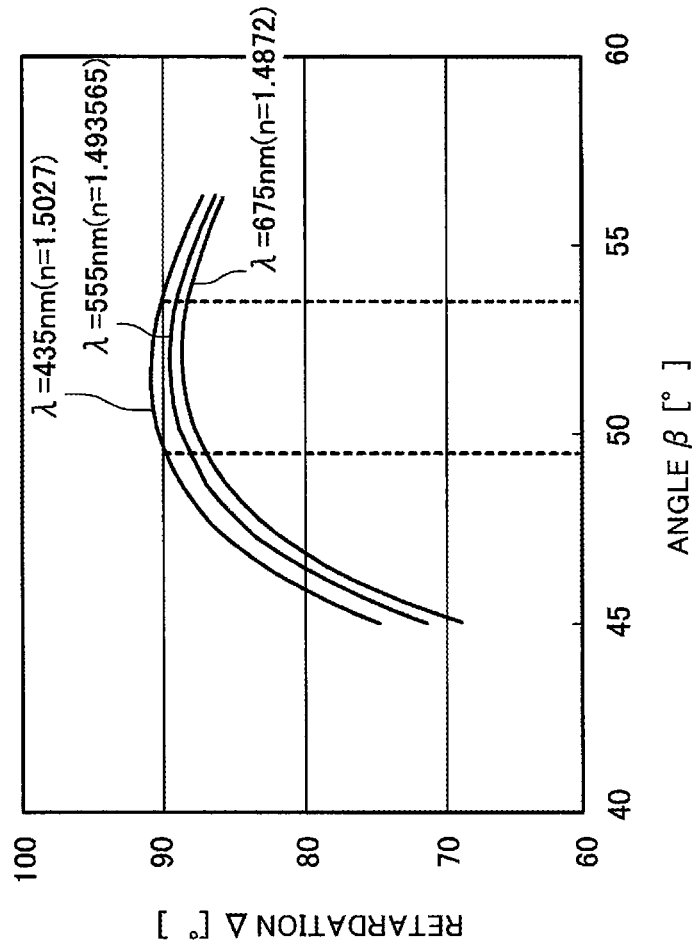
FIG. 3 is a graph illustrating the distribution of a retardation DELTA with respect to an angle beta when using an axially symmetric polarization conversion element formed of an acrylic material.

FIG. 3 is a graph illustrating the distribution of the retardation DELTA with respect to the angle beta when using an acrylic material as the material for forming the axially symmetric polarization conversion element 10. The distribution of the retardation DELTA is calculated by substituting the refractive index n when the wavelength lambda of the incident light is 435 nm, 555 nm, or 675 nm in the expression (1). As illustrated in FIG. 3, when the axially symmetric polarization conversion element 10 is formed of an acrylic material, the retardation DELTA is about 90° independently of the wavelength of the incident light (achromatically) when the angle beta is set within the range of 49° to 54°.

Since the incident light incident on the axially symmetric polarization conversion element 10 is radially reflected by the inner circumferential surface 22, a different retardation occurs depending on the reflection orientation. Specifically, the polarization state of the ring-shaped axially symmetric polarized beam PB differs depending on the orientation theta in the circumferential direction (see FIG. 2). For example, a retardation DELTA of 90° occurs (i.e., left-handed circularly polarized light is obtained) when the light (L1) is reflected by the inner circumferential surface 22 at an orientation angle theta of 90°. This also applies to the light (L2) that is reflected by the inner circumferential surface 22 at an orientation angle theta of 270°. A retardation DELTA of 90° occurs (i.e., right-handed circularly polarized light is obtained) when the light is reflected by the inner circumferential surface 22 at an orientation angle theta of 0° or 180°. When the light (L3) is reflected by the inner circumferential surface 22 at an orientation angle theta of 45°, linearly polarized light having a polarization orientation of 45° is obtained since no phase-lag polarized component is present.

Figure 4:
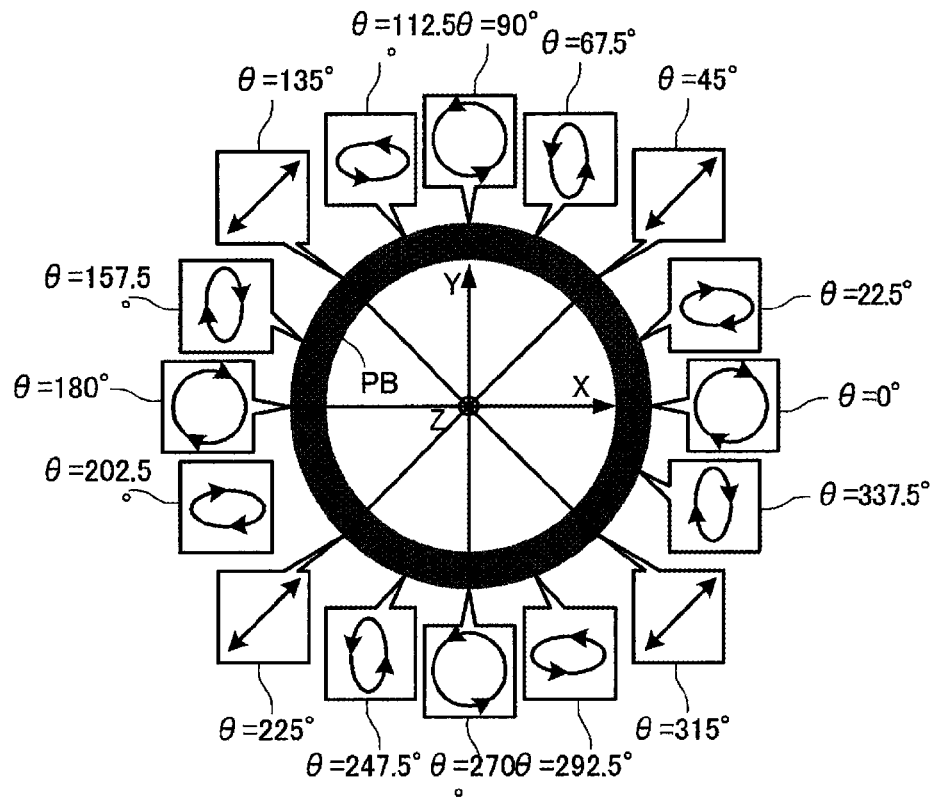
FIG. 4 is a schematic diagram illustrating the polarization state of an axially symmetric polarized beam in more detail.

FIG. 4 is a schematic diagram illustrating the polarization state of the axially symmetric polarized beam PB in more detail.

As illustrated in FIG. 4, the axially symmetric polarized beam PB is right-handed circularly polarized light when the orientation angle theta is 0°, becomes linearly polarized light at an orientation angle theta of 45° through right-handed elliptically polarized light, and becomes left-handed circularly polarized light at an orientation angle theta of 90° through left-handed elliptically polarized light. The axially symmetric polarized beam PB becomes linearly polarized light at an orientation angle theta of 135° through left-handed elliptically polarized light, and becomes right-handed circularly polarized light at an orientation angle theta of 180° through right-handed elliptically polarized light. The polarization state similarly changes within the orientation angle (theta) range of 180° to 360°. Specifically, the polarization state of the axially symmetric polarized beam PB cyclically changes in the circumferential direction, and the polarization distribution is symmetrical with respect to the optical axis AO (Z-axis).

Figure 5:
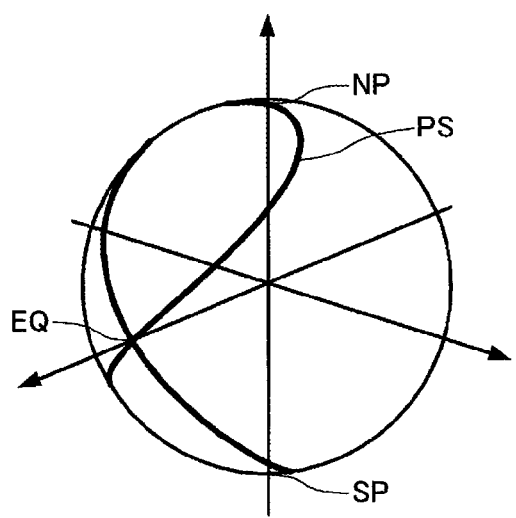
FIG. 5 is a diagram illustrating a change in polarization state of an axially symmetric polarized beam in the circumferential direction using the Poincaré sphere.

As illustrated in FIG. 5, the change in the polarization state of the axially symmetric polarized beam PB in the circumferential direction is represented by a path PS that cuts a figure of eight so as to pass through a north pole NP, a point EQ on the equator, and a south pole SP.

Such a change in the polarization state of the axially symmetric polarized beam PB in the circumferential direction is equivalent to a temporal change in the polarization state of output light obtained by causing linearly polarized light to be incident on a quarter-wave plate (e.g., Fresnel rhomb quarter-wave plate), and rotating the quarter-wave plate around the optical axis.

Specifically, the axially symmetric polarization conversion element 10 according to one embodiment of the invention can generate an axially symmetric polarized beam that has the change in polarization state obtained by rotating a quarter-wave plate around the optical axis in the circumferential direction. When the axially symmetric polarization conversion element 10 is designed so that the retardation DELTA is 180° (half wavelength), the axially symmetric polarization conversion element 10 can generate an axially symmetric polarized beam that has the change in polarization state obtained by rotating a half-wave plate around the optical axis in the circumferential direction.

Although an example in which the axially symmetric polarized beam is generated by using one axially symmetric polarization conversion element 10 (axially symmetric polarization conversion element 11) has been described above, a plurality of axially symmetric polarization conversion elements 10 may be disposed along the same optical path to generate an axially symmetric polarized beam.

Figure 6A:
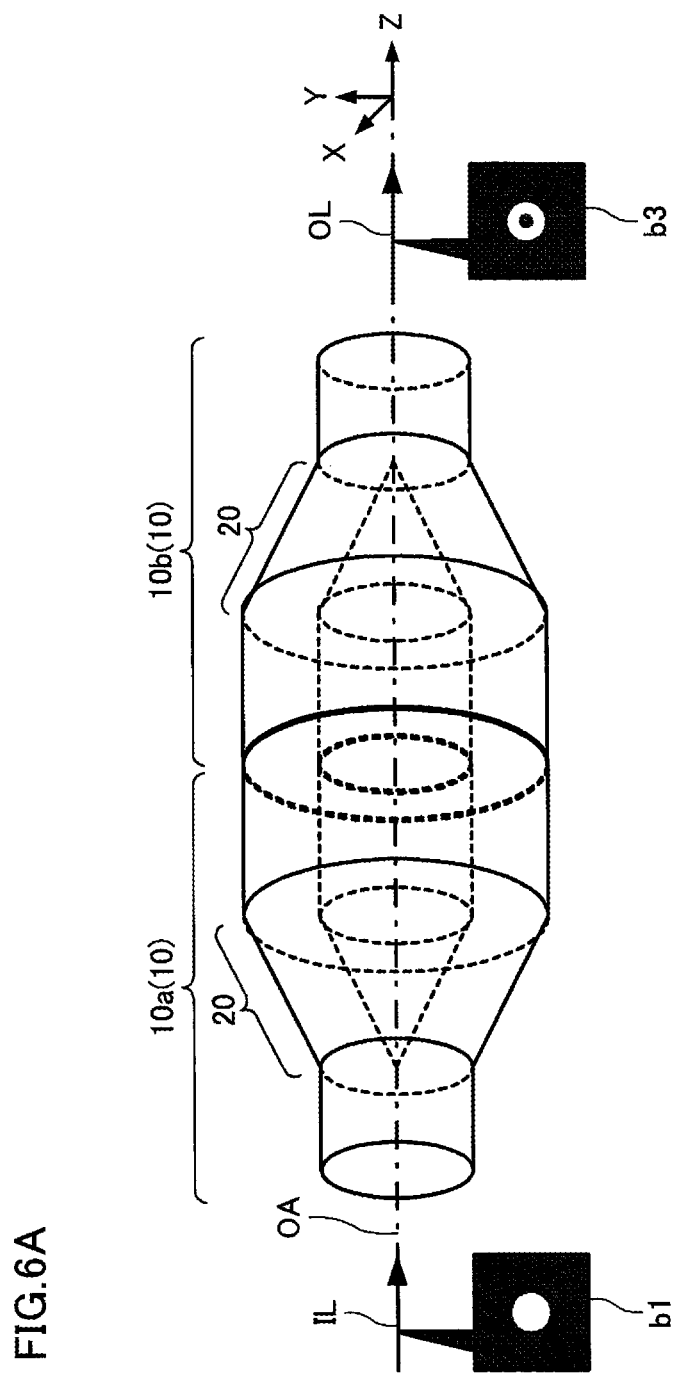
FIG. 6A is a diagram illustrating a configuration example when two axially symmetric polarization conversion elements are disposed along an optical path.

FIG. 6A illustrates a configuration example when two axially symmetric polarization conversion elements 10 are disposed along the optical path, and FIG. 6B illustrates a configuration example when two axially symmetric polarization conversion elements 11 are disposed along the optical path. Two axially symmetric polarization conversion elements 10a and 10b (two axially symmetric polarization conversion elements 11a and 11b) are disposed to be adjacent to each other along the same optical path (optical axis OA) so that the direction with respect to the incident light IL is opposite to each other.

When a Gaussian beam (see b1 in FIGS. 6A and 6B) (e.g., linearly polarized beam) is incident on the axially symmetric polarization conversion element 10a (axially symmetric polarization conversion element 11a) as the incident light IL, an axially symmetric polarized beam having a Laguerre-Gaussian distribution (i.e., a hollow distribution having a polarization singularity at the center) (see b3 in FIGS. 6A and 6B) is emitted from the axially symmetric polarization conversion element 10b (axially symmetric polarization conversion element 11b) as the output light OL. The incident light IL that is incident on the axially symmetric polarization conversion element 10a is totally reflected twice inside a reflection section 20a included in the axially symmetric polarization conversion element 10a, incident on the axially symmetric polarization conversion element 10b, and totally reflected twice inside a reflection section 20b included in the axially symmetric polarization conversion element 10b.

Figure 7:
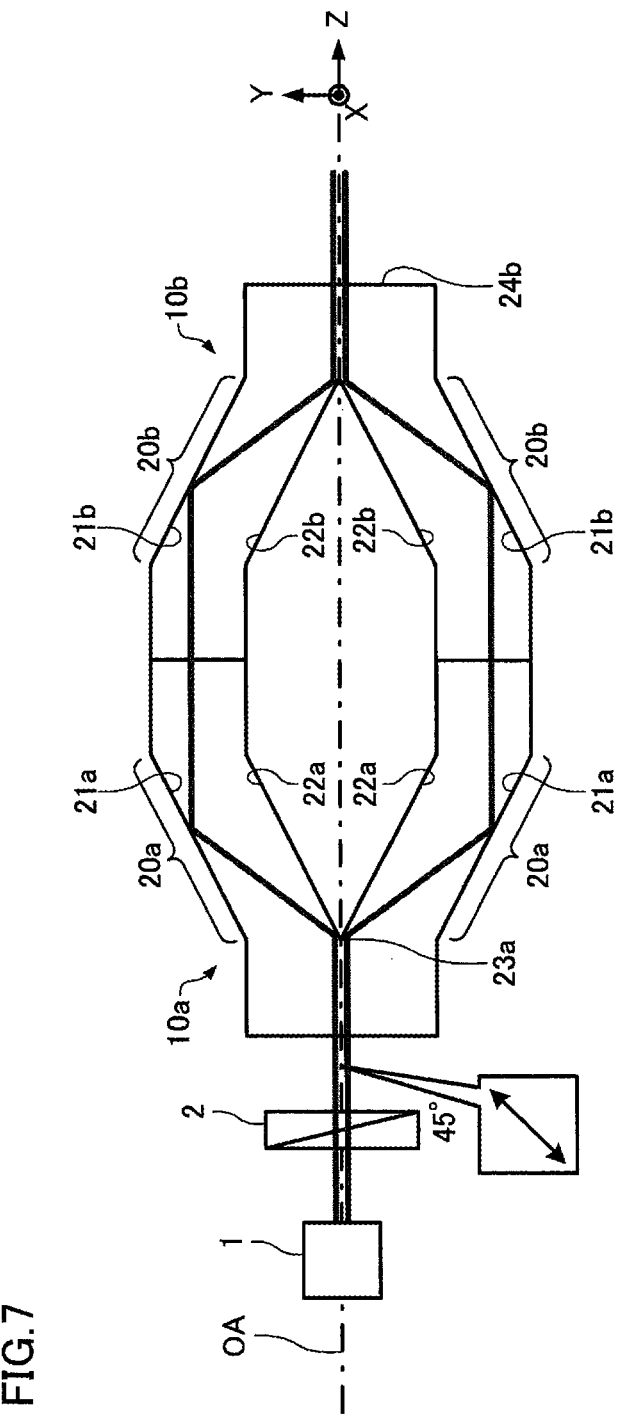
FIG. 7 is a diagram schematically illustrating the state of reflection of incident light by two axially symmetric polarization conversion elements.

FIG. 7 is a diagram schematically illustrating the state of reflection of the incident light by the axially symmetric polarization conversion elements 10a and 10b. Note that the following description is similarly applied to the case where the axially symmetric polarization conversion elements 10a and 10b are replaced with the axially symmetric polarization conversion elements 11a and 11b illustrated in FIG. 6B.

As illustrated in FIG. 7, light emitted from the light source 1 (e.g., laser light source or SLD) is converted by the polarizer 2 into linearly polarized light having a polarization orientation of 45°, and incident on the axially symmetric polarization conversion element 10a. The light incident on a vertex 23a of the inverted conical shape of the reflection section 20a is radially reflected by an inner circumferential surface 22a. The light radially reflected by the inner circumferential surface 22a is reflected by an outer circumferential surface 21a, and incident on the axially symmetric polarization conversion element 10b. The ring-shaped axially symmetric polarized beam incident on the axially symmetric polarization conversion element 10b is reflected by an outer circumferential surface 21b and an inner circumferential surface 22b of the reflection section 20b, and emitted from an exit face 24b as an axially symmetric polarized beam having a Laguerre-Gaussian distribution. Specifically, the ring-shaped axially symmetric polarized beam emitted from the axially symmetric polarization conversion element 10a is converted into an axially symmetric polarized beam having the same beam diameter as that of the linearly polarized incident light through the two total reflections by the axially symmetric polarization conversion element 10b, and emitted from the axially symmetric polarization conversion element 10b.

Since the retardation DELTA occurs due to the two total reflections by the axially symmetric polarization conversion element 10a, and the retardation DELTA also occurs due to the two total reflections by the axially symmetric polarization conversion element 10b, a retardation 2DELTA occurs in total. Since the retardation DELTA is 90°, a retardation of 180° (half wavelength) is obtained by the optical system in which the axially symmetric polarization conversion elements 10a and the 10b are disposed.

Figure 8:
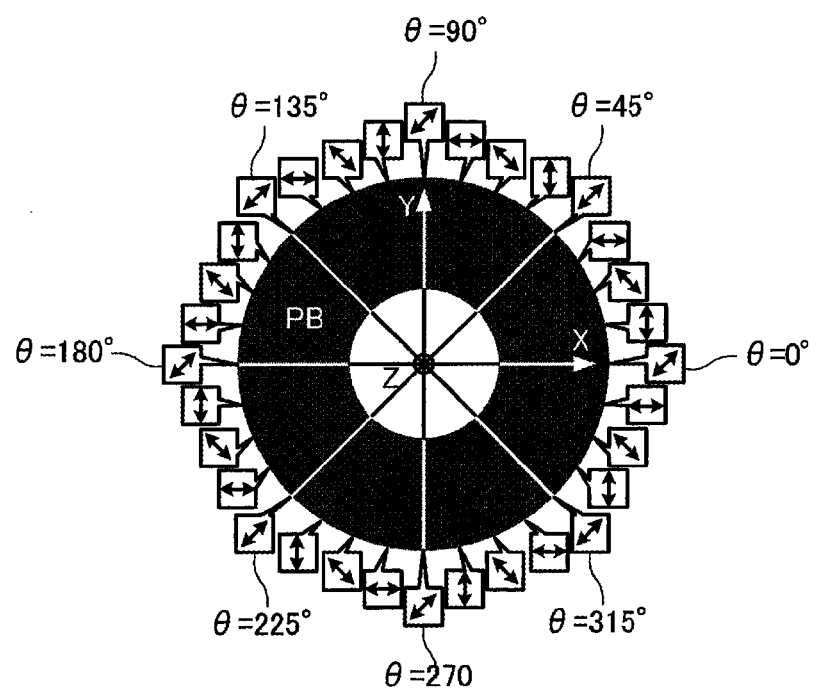
FIG. 8 is a diagram schematically illustrating the polarization state of an axially symmetric polarized beam generated by an optical system in which two axially symmetric polarization conversion elements are disposed.

FIG. 8 is a diagram schematically illustrating the polarization state of the axially symmetric polarized beam generated by the optical system in which the axially symmetric polarization conversion elements 10a and 10b are disposed.

As illustrated in FIG. 8, the axially symmetric polarized beam PB is linearly polarized light having a polarization orientation of 45° when the orientation angle theta is 0°, becomes linearly polarized light having a polarization orientation of 225° at an orientation angle theta of 45° through linearly polarized light having a polarization orientation of 90°, linearly polarized light having a polarization orientation of 135°, and linearly polarized light having a polarization orientation of 180°, and becomes linearly polarized light having a polarization orientation of 45° at an orientation angle theta of 90° through linearly polarized light having a polarization orientation of 270°, linearly polarized light having a polarization orientation of 315°, and linearly polarized light having a polarization orientation of 0°. Specifically, the polarization orientation of the linearly polarized light rotates one revolution (rotates 360°) within the orientation angle (theta) range of 0° to 90°. Likewise, the polarization orientation of the linearly polarized light rotates one revolution within the orientation angle (theta) range of 90° to 180°, 180° to 270°, or 270° to 360°. Specifically, the axially symmetric polarized beam PB illustrated in FIG. 8 has an axially symmetric polarization distribution in which the polarization orientation of the linearly polarized light rotates four revolutions within the orientation angle (theta) range of 0° to 360°.

An axially symmetric polarized beam having a polarization distribution in which the polarization orientation of linearly polarized light changes (rotates) in the beam circumferential direction can be generated by disposing a plurality of axially symmetric polarization conversion elements 10 along the optical path.

Note that an axially symmetric polarized beam having the polarization distribution illustrated in FIG. 4 (i.e., an axially symmetric polarized beam that has the change in polarization state obtained by rotating a quarter-wave plate around the optical axis in the circumferential direction) and having a polarization singularity at the center can be generated by utilizing an optical system in which two axially symmetric polarization conversion elements designed so that the retardation DELTA is 45° are disposed along the optical path.

Figure 9A:
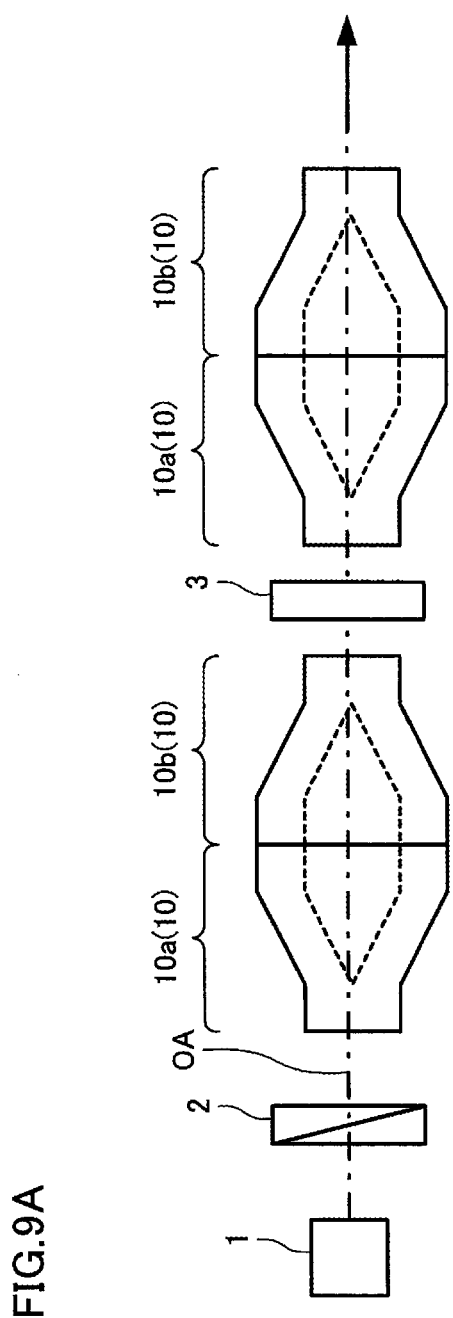
FIG. 9A is a diagram illustrating a configuration example when a plurality of pairs of axially symmetric polarization conversion elements are disposed along an optical path.
Figure 9B:
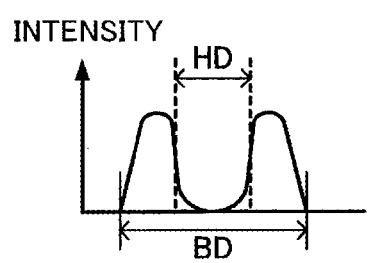
FIG. 9B is a graph illustrating the intensity distribution of an axially symmetric polarized beam generated by using an optical system in which two axially symmetric polarization conversion elements are disposed.

As illustrated in FIG. 9A, a plurality of pairs of axially symmetric polarization conversion elements 10a and 10b may be disposed along the optical path (optical axis OA) on either side of a half-wave plate 3. In the example illustrated in FIG. 9A, two pairs of axially symmetric polarization conversion elements 10a and 10b are disposed along the optical path. The axially symmetric polarized beam PB obtained by the optical system illustrated in FIG. 9A has an axially symmetric polarization distribution in which the polarization orientation of linearly polarized light rotates eight revolutions within the orientation angle (theta) range of 0° to 360°. The optical system illustrated in FIG. 9A also makes it possible to increase the diameter HD of the hollow part (i.e., low-intensity center part) of the axially symmetric polarized beam (see FIG. 9B) without changing the beam diameter BD of the axially symmetric polarized beam. An axially symmetric polarized beam having a larger diameter HD can be generated by increasing the number of pairs of axially symmetric polarization conversion elements 10a and 10b disposed along the optical path. This is effective when using an axially symmetric polarized beam generated by utilizing the axially symmetric polarization conversion element according to one embodiment of the invention as a stimulated emission depletion (STED) beam for an STED microscope.

The axially symmetric polarization conversion element according to one embodiment of the invention can thus generate an axially symmetric polarized beam having various type of polarization distribution using a simple configuration. Since the axially symmetric polarization conversion element according to one embodiment of the invention is produced using optical glass, acrylic resin and so on, the axially symmetric polarization conversion element has resistance to a change in temperature and a change with the passage of time, and can implement a reduction in cost. The axially symmetric polarization conversion element according to one embodiment of the invention also has an advantage in that the axially symmetric polarization conversion element does not have wavelength dependence since Fresnel reflection is used.

Note that the invention is not limited to the above embodiments, and various modifications and variations may be made of the above embodiments.

Although an example in which the retardation DELTA is obtained by two Fresnel reflections that occur inside the axially symmetric polarization conversion element has been described above, the slope angle beta may be changed, and the retardation DELTA (e.g., DELTA=90° or 180°) may be obtained by four Fresnel reflections. It suffices that the number N of Fresnel reflections that occur inside the axially symmetric polarization conversion element be a positive integer. For example, light provided with a retardation by one Fresnel reflection may be condensed to generate an axially symmetric polarized beam. The retardation obtained by Fresnel reflection may be changed by forming (depositing) a dielectric multilayer film on the outer circumferential surface 21 and the inner circumferential surface 22 of the axially symmetric polarization conversion element 10 (axially symmetric polarization conversion element 11).

The invention claimed is:

1. An axially symmetric polarization conversion element that converts incident light into an axially symmetric polarized beam,
   the axially symmetric polarization conversion element having a shape obtained by rotating a cross section of a Fresnel rhomb wave plate along a direction of an optical axis around an axis that is parallel to the optical axis,
   the axially symmetric polarization conversion element converting the incident light into the axially symmetric polarized beam by utilizing N number of Fresnel reflections, wherein N is a positive integer,
   the axially symmetric polarization conversion element having an outer circumferential surface that corresponds to a slope of a truncated conical shape, and an inner circumferential surface that corresponds to a slope of an inverted conical shape that is present inside the truncated conical shape, and reflecting an linearly polarized Gaussian beam incident on a vertex of the inverted conical shape by the inner circumferential surface and the outer circumferential surface to emit a ring-shaped axially symmetric polarized beam, and
   the axially symmetric polarized beam is in a ring shape having linearly polarized light at 90 degree intervals and circularly polarized light at 90 degree intervals, and each linearly polarized light is spaced apart from each circularly polarized light by 45 degrees.

2. The axially symmetric polarization conversion element as defined in claim 1,
   the axially symmetric polarization conversion element converting the linearly polarized Gaussian beam into the ring-shaped axially symmetric polarized beam by utilizing said positive integer.

3. The axially symmetric polarization conversion element as defined in claim 1,
   the axially symmetric polarization conversion element being formed of optical glass or an optical acrylic resin.

4. An axially symmetric polarized beam generation device that generates an axially symmetric polarized beam, the axially symmetric polarized beam generation device comprising:
   a light source; and
   an axially symmetric polarization conversion element that converts incident light from the light source into the axially symmetric polarized beam,
   the axially symmetric polarization conversion element having a shape obtained by rotating a cross section of a Fresnel rhomb wave plate along a direction of an optical axis around an axis that is parallel to the optical axis, and
   the axially symmetric polarization conversion element converting the incident light into the axially symmetric polarized beam by utilizing N number of Fresnel reflections, wherein N is a positive integer,
   wherein the axially symmetric polarization conversion element has an outer circumferential surface that corresponds to a slope of a truncated conical shape, and an inner circumferential surface that corresponds to a slope of an inverted conical shape that is present inside the truncated conical shape, and reflects an linearly polarized Gaussian beam incident on a vertex of the inverted conical shape by the inner circumferential surface and the outer circumferential surface to emit a ring-shaped axially symmetric polarized beam, and
   the axially symmetric polarized beam is in a ring shape having linearly polarized light at 90 degree intervals and circularly polarized light at 90 degree intervals, and each linearly polarized light is spaced apart from each circularly polarized light by 45 degrees.

5. The axially symmetric polarized beam generation device as defined in claim 4,
   wherein the axially symmetric polarization conversion element converts the linearly polarized Gaussian beam into the ring-shaped axially symmetric polarized beam by utilizing said positive integer.

6. The axially symmetric polarized beam generation device as defined in claim 4, comprising a plurality of the axially symmetric polarization conversion elements, the plurality of the axially symmetric polarization conversion elements being disposed along an optical path.

7. The axially symmetric polarized beam generation device as defined in claim 4,
   wherein the axially symmetric polarization conversion element is formed of optical glass or an optical acrylic resin.

8. An axially symmetric polarized beam generation method comprising:
   generating an axially symmetric polarized beam by using an axially symmetric polarization conversion element,
   the axially symmetric polarization conversion element having a shape obtained by rotating a cross section of a Fresnel rhomb wave plate along a direction of an optical axis around an axis that is parallel to the optical axis, and converting incident light into the axially symmetric polarized beam by utilizing N number of Fresnel reflections, wherein N is a positive integer,
   wherein the axially symmetric polarization conversion element has an outer circumferential surface that corresponds to a slope of a truncated conical shape, and an inner circumferential surface that corresponds to a slope of an inverted conical shape that is present inside the truncated conical shape so that the incident light is reflected by the slope of the inverted conical shape, and
   the axially symmetric polarized beam is in a ring shape having linearly polarized light at 90 degree intervals and circularly polarized light at 90 degree intervals, and each linearly polarized light is spaced apart from each circularly polarized light by 45 degrees.

9. The axially symmetric polarized beam generation method as defined in claim 8, comprising:
   providing linearly polarized light to be incident on the axially symmetric polarization conversion element to generate the axially symmetric polarized beam.

10. The axially symmetric polarized beam generation method as defined in claim 9, comprising:
    providing a linearly polarized Gaussian beam to be incident on a vertex of the inverted conical shape by the inner circumferential surface and the outer circumferential surface of the axially symmetric polarization conversion element to generate a ring-shaped axially symmetric polarized beam.

11. The axially symmetric polarized beam generation method as defined in claim 8, comprising:
generating the axially symmetric polarized beam by using a plurality of the axially symmetric polarization conversion elements disposed along an optical path.

* * * * *